United States Patent

Nguyen et al.

[11] Patent Number: 6,087,998
[45] Date of Patent: Jul. 11, 2000

[54] DUPLEX ANTENNA CIRCUIT ASSEMBLY SELECTIVELY OPERATIONAL IN A TRANSMIT OR A RECEIVE MODE

[75] Inventors: Tuan Kien Nguyen; Jun San Bong; Jia Sun, all of Singapore, Singapore

[73] Assignee: Motorola, Inc., Schaumburg, Ill.

[21] Appl. No.: 09/274,046

[22] Filed: Mar. 22, 1999

[30]      Foreign Application Priority Data

Jan. 4, 1998 [SG] Singapore ............................... 9800684

[51] Int. Cl.⁷ ................................. H01Q 1/36; H04J 1/00
[52] U.S. Cl. ........................... 343/741; 370/278; 455/86; 455/82; 333/1.1
[58] Field of Search ..................................... 343/741, 745, 343/747, 752, 820, 845, 850, 858; 333/1.1; 455/82, 83, 86; 370/278, 281

[56]               References Cited

U.S. PATENT DOCUMENTS

| | | | |
|---|---|---|---|
| 4,685,099 | 8/1987 | White et al. ............................... | 370/30 |
| 5,896,113 | 4/1999 | O'Neill, Jr. ............................... | 343/895 |
| 5,909,196 | 6/1999 | O'Neill, Jr. ............................... | 343/895 |

*Primary Examiner*—Don Wong
*Assistant Examiner*—James Clinger
*Attorney, Agent, or Firm*—Philip P. Macnak

[57]               ABSTRACT

A duplex antenna circuit assembly (1) selectively operational in a transmit or a receive mode. The assembly (1) has a transmitter amplifier (2) with an output coupled to an input of a transmitter impedance matching circuit (3) and there is a dual purpose transmitter tuning circuit (4) having an input coupled to an output of the transmitter impedance matching circuit (3). The assembly (1) also has a receiver amplifier (8) with an input coupled to an output of a receiver impedance matching circuit (9) and there is a dual purpose receiver tuning circuit (10) having an output coupled to an input of the receiver impedance matching circuit (9). There is also an antenna (5) having a first terminal output (6) coupled to the output of the transmitter tuning circuit (4) and a second terminal (7) coupled to an input of the receiver tuning circuit (10). When the assembly (1) is in transmit mode the transmitter tuning circuit (4) is operating substantially at resonance with the antenna (5), whilst the receiver tuning circuit (10) provides a low impedance coupling of the second terminal (7) to ground. Alternatively, when the assembly (1) is in receive mode, the receiver tuning circuit (10) is operating substantially at resonance with the antenna (5) whilst the transmitter tuning circuit (4) provides a low impedance coupling of the first terminal (6) to ground.

11 Claims, 2 Drawing Sheets

6,087,998

DUPLEX ANTENNA CIRCUIT ASSEMBLY SELECTIVELY OPERATIONAL IN A TRANSMIT OR A RECEIVE MODE

FIELD OF THE INVENTION

This invention relates to a duplex antenna circuit assembly selectively operational in a transmit or a receive mode. The invention is particularly useful for, but not necessarily limited to, portable communication devices such as two way pagers and other two way radio communication devices.

BACKGROUND ART

Traditional wireless telecommunications antenna such as quarterwave monopole antenna, half wave dipole antenna, helical antenna, spiral antenna and the like usually include a input antenna terminal and a ground antenna terminal. The ground antenna terminal is connected to a wireless telecommunication common (ground) and a input terminal of the antenna is connected to the telecommunication device's input or output or both. In case a same antenna is used to concurrently receive and transmit signals operating at relatively similar frequencies, a dedicated circuit (diplexer) is used to fulfil the purpose of isolating the input and the output of the telecommunication device while selectively coupling the input and output signal from and to the antenna's input terminal.

In case the same antenna and same active terminal are used to alternately receive or transmit signals in simplex mode, a selective switching system is used for the purpose of alternate coupling and isolation. In both cases described above, the antenna itself is approximately resonant at both transmit and receive frequencies and therefore both frequencies must be approximately the same. When the transmit signal and the receive signal are significantly different in frequency, the use of a diplexer or switching circuit may be impractical and uneconomical for certain applications due to the unnecessary circuitry components and space required.

SUMMARY OF THE INVENTION

It is an aim of the invention to overcome or alleviate at least one of the problems associated with prior art duplex antenna circuit assemblies for two way pagers and other two way radio communication devices.

According to one aspect of the invention there is provided a duplex antenna circuit assembly selectively operational in a transmit or a receive mode, said antenna circuit assembly comprising:

a transmitter amplifier with an output coupled to an input of a transmitter impedance matching circuit;

a dual purpose transmitter tuning circuit having an input coupled to an output of said transmitter impedance matching circuit;

a receiver amplifier with an input coupled to an output of a receiver impedance matching circuit;

a dual purpose receiver tuning circuit having an output coupled to an input of said receiver impedance matching circuit; and an antenna having a first terminal and a second terminal, said first terminal being coupled to an output of said transmitter tuning circuit and said second terminal being coupled to an input of said receiver tuning circuit, wherein when said antenna circuit assembly is in said transmit mode said transmitter tuning circuit is operating substantially at resonance with said antenna whilst said receiver tuning circuit provides a low impedance coupling of said second terminal to ground, and wherein when said antenna circuit assembly is in said receive mode said receiver tuning circuit is operating substantially at resonance with said antenna whilst said transmitter tuning circuit provides a low impedance coupling of said first terminal to ground.

Suitably, said dual purpose transmitter tuning circuit may comprise solely of passive components.

Preferably, said dual purpose receiver tuning circuit may comprise solely of passive components.

The passive components may suitably include capacitors and inductors. Preferably said capacitors may include a voltage controllable capacitor.

Preferably, said dual purpose receiver tuning circuit may comprise purely of at least one inductor and at least one capacitor.

Suitably, said inductor may be a discrete inductance or alternatively the inductor may be effectively the inherent inductance of said antenna.

Preferably, said antenna circuit when in said receive mode may operate at a receiving frequency and when in said transmit mode it may operate at a transmitting frequency, wherein said transmitting and receiving frequency are at least 100 MHz apart.

Suitably, said antenna circuit when in said receive mode may operate at a receiving frequency and when in said transmit mode operates at a transmitting frequency, wherein said transmit frequency may be substantially higher than said receive frequency.

Preferably, said transmit frequency may be at least double said receive frequency.

Alternatively, said receive frequency may be substantially higher than said transmit frequency.

Preferably, said receive frequency may be at least double said transmit frequency.

Suitably, said dual purpose transmitter tuning circuit may comprise purely of at least one inductor and at least one capacitor.

Preferably, said antenna may be a loop antenna. However, said antenna may be any antenna having more than one terminal.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
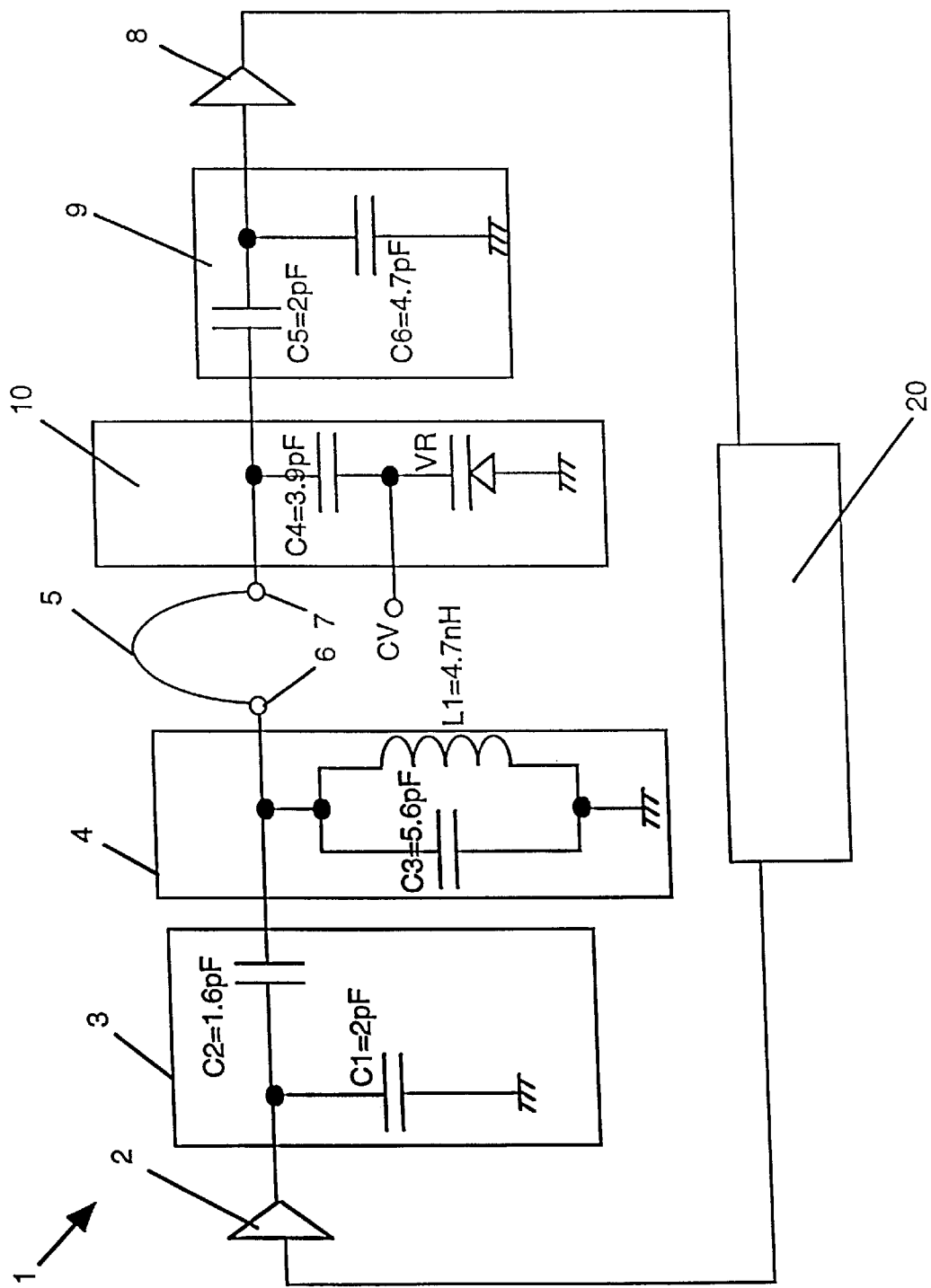
FIG. 1 shows a schematic diagram of a duplex antenna circuit assembly according to one embodiment of the invention.

Referring to FIG. 1, there is illustrated a duplex antenna circuit assembly I selectively operational in a transmit or a receive mode. The a duplex antenna circuit assembly 1 comprises a transmitter amplifier 2 with an output coupled to an input of a transmitter impedance matching circuit 3. There is also a dual purpose transmitter tuning circuit 4 having an input coupled to an output of transmitter impedance matching circuit 3.

The duplex circuit assembly 1 also has a receiver amplifier 8 with an input coupled to an output of a receiver impedance matching circuit 9. Further, there is a dual purpose receiver tuning circuit 10 having an output coupled to an input of the receiver impedance matching circuit 9. The a duplex antenna circuit assembly 1 also includes a loop antenna 5 having a first terminal 6 and a second terminal 7, the first terminal 5 being coupled to an output of said transmitter tuning circuit 4 and the second terminal 7 being coupled to an input of the receiver tuning circuit 10.

Both the a dual purpose transmitter tuning circuit 4 and dual purpose receiver tuning circuit 10 comprise solely of passive components. In this regard, tuning circuit 4 is formed from a parallel Inductor and Capacitor network L1 and C3 coupled to ground. In contrast, tuning circuit 10 is formed from a series capacitor network C4 and a voltage controllable capacitor in the form of a Varactor VR having an anode coupled to ground. In this embodiment, the inductance of tuning circuit 10 is provided by the inherent inductance of loop antenna 5. The value of capacitance for Varactor VR is determined by the voltage applied to the control voltage terminal CV and therefore allows fine tuning of tuning circuit 10.

As will be apparent to a person skilled in the art, transmitter impedance matching circuit 3 comprises two capacitors C1, C2 with selected values for operating at the desired transmit frequency. Capacitor C1 provides ground coupling for the output of transmitter amplifier 2 and capacitor C2 couples the output of transmitter amplifier 2 to the input of tuning circuit 4. Similarly, receiver impedance matching circuit 9 comprises two capacitors C5, C6 with selected values for operating at the desired receive frequency. Capacitor C6 provides ground coupling for the input of receiver amplifier 8 and capacitor C5 couples the input of receiver amplifier 8 to the output of tuning circuit 10.

Figure 2:
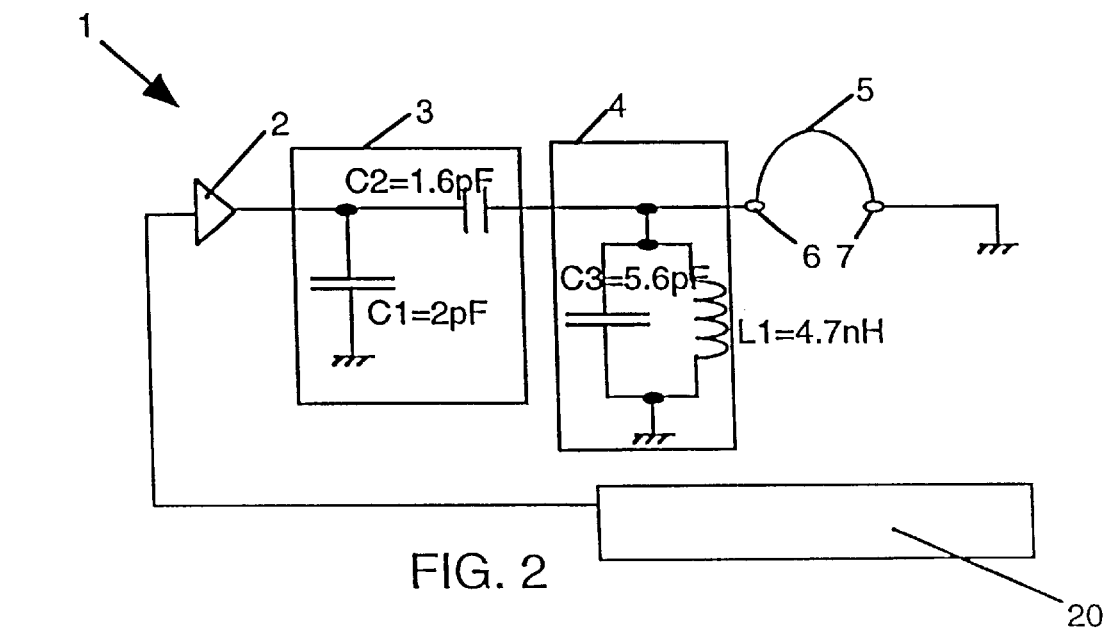
FIG. 2 shows a schematic diagram of the effective duplex antenna circuit assembly of FIG. 1 when operating in transmit mode.

Both amplifiers 2 and 8 are operatively coupled to further circuitry 20 which, as will be apparent to a person skilled in the art, controls, receives, and sends signals to amplifiers 2 and 8. When in transmit mode, amplifier 2 sends a Radio Frequency signal of approximately 925 MHz via the impedance matching circuit 3 and dual purpose transmitter tuning circuit 4 to loop antenna 5. As illustrated in FIG. 2, at this transmit frequency the transmitter tuning circuit 4 is at resonance whilst the receiver tuning circuit provides a low impedance coupling of the second terminal 7 to ground. This occurs due to the frequency dependent component network of L1, C3 being selected to resonate at 925 MHz, whereas C4 and VR have values that have a substantially low impedance at this transmit frequency.

Figure 3:
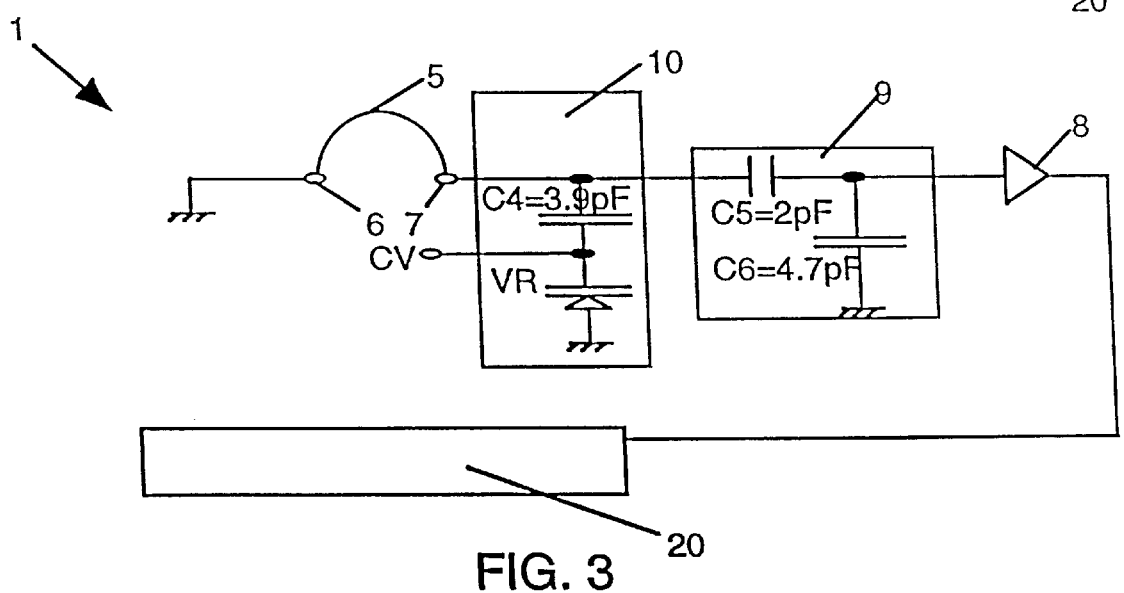
FIG. 3 shows a schematic diagram of the effective duplex antenna circuit of FIG. 1 when operating in receive mode.

In contrast, and as illustrated in FIG. 3, when circuit assembly 1 is in receive mode, the receiver tuning circuit 10 is operating substantially at resonance to select signal frequencies of approximately 280 MHz. At this frequency the transmitter tuning circuit 4 provides a low impedance coupling of the first terminal to ground. This occurs due to the frequency dependent component network of VR, C4 and the inherent inductance of antenna 5 being selected to resonate at 280 MHz, whereas is selected so that it has a substantially low impedance at this receive frequency.

Advantageously, the present invention allows for the antenna 5 to operate in transmit or receive mode without the need for active components to select and configure the tuning circuits 4, 10. These frequencies are hundreds of MHz apart and the transmit frequency is more than double the receive frequency. This frequency difference and the selection and configuration of the frequency dependent components C3, L1, C4 and VR allow for different functions to be provided by the tuning circuits 4, 10 when circuit assembly 1 is in transmit mode as opposed to received mode.

Figure 4:
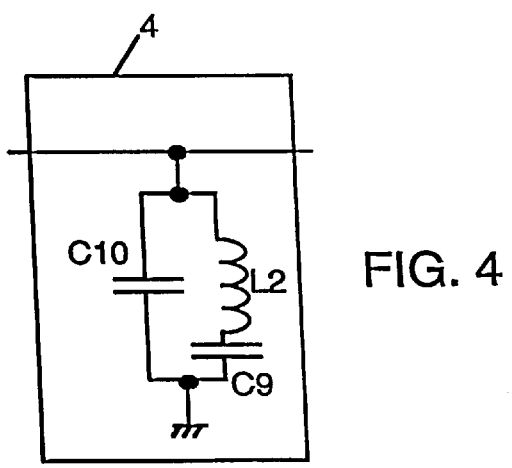
FIG. 4 is an alternative preferred embodiment of a dual purpose transmitter tuning circuit for use in the a duplex antenna circuit of FIG. 1.

As will be apparent to a person skilled in the art, the dual purpose transmitter tuning circuit 4 may take many forms and another preferred form is illustrated in FIG. 4. As illustrated, the dual purpose transmitter tuning circuit 4 comprises a series LC circuit of Capacitor L2 and Capacitor C9, this LC series circuit is in parallel with a capacitor C10. Hence, this circuit provides a lower impedance (when operating at the receive frequency) than the embodiment of FIG. 1. Hence, the losses will be slightly less in this embodiment, however an extra capacitor is required.

Although the invention has been described with reference to a preferred embodiment, it is to be understood that the invention is not restricted the embodiments described herein.

We claim:

1. A duplex antenna circuit assembly selectively operational in a transmit or a receive mode, said antenna circuit assembly comprising:

a transmitter amplifier with an output coupled to an input of a transmitter impedance matching circuit;

a dual purpose transmitter tuning circuit having an input coupled to an output of said transmitter impedance matching circuit;

a receiver amplifier with an input coupled to an output of a receiver impedance matching circuit;

a dual purpose receiver tuning circuit having an output coupled to an input of said receiver impedance matching circuit; and an antenna having a first terminal and a second terminal, said first terminal being coupled to an output of said transmitter tuning circuit and said second terminal being coupled to an input of said receiver tuning circuit, wherein when said antenna circuit assembly is in said transmit mode said transmitter tuning circuit is operating substantially at resonance with said antenna whilst said receiver tuning circuit provides a low impedance coupling of said second terminal to ground, and wherein when said antenna circuit assembly is in said receive mode said receiver tuning circuit is operating substantially at resonance with said antenna whilst said transmitter tuning circuit provides a low impedance coupling of said first terminal to ground.

2. A duplex antenna circuit assembly as claimed in claim 1, wherein said dual purpose transmitter tuning circuit comprises solely of passive components.

3. A duplex antenna circuit assembly as claimed in claim 1, wherein said dual purpose receiver tuning circuit comprises solely of passive components.

4. A duplex antenna circuit assembly as claimed in claim 2, wherein, said dual purpose receiver tuning circuit comprises purely of at least one inductor and at least one capacitor.

5. A duplex antenna circuit assembly as claimed in claim 4, wherein said inductor may be a discrete inductance or alternatively the inductor may be effectively the inherent inductance of said antenna.

6. A duplex antenna circuit assembly as claimed in claim 4, wherein said antenna circuit when in said receive mode operates at a receiving frequency and when in said transmit mode operates at a transmitting frequency, and wherein said transmitting and receiving frequency are at least 100 MHz apart.

7. A duplex antenna circuit assembly as claimed in claim 4, wherein said antenna circuit when in said receive mode operates at a receiving frequency and when in said transmit mode operates at a transmitting frequency, wherein said transmit frequency is substantially higher than said receive frequency.

8. A duplex antenna circuit assembly as claimed in claim 7, wherein transmit frequency is at least double said receive frequency.

9. A duplex antenna circuit assembly as claimed in claim 4, wherein said antenna circuit when in said receive mode operates at a receiving frequency and when in said transmit mode operates at a transmitting frequency, wherein said receive frequency is substantially higher than said transmit frequency.

10. A duplex antenna circuit assembly as claimed in claim 9, wherein, said receive frequency is at least double said transmit frequency.

11. A duplex antenna circuit assembly as claimed in claim 1, wherein said antenna is loop antenna.

\* \* \* \* \*